Sept. 25, 1962 G. ALFIERI 3,055,678
AUTOMATIC PRESSURE FLUID DISTRIBUTOR FOR PNEUMATIC SUSPENSION
PLANTS, PARTICULARLY FOR THREE AXLE VEHICLES
Filed Oct. 8, 1959 2 Sheets-Sheet 1

United States Patent Office 3,055,678
Patented Sept. 25, 1962

3,055,678
AUTOMATIC PRESSURE FLUID DISTRIBUTOR
FOR PNEUMATIC SUSPENSION PLANTS, PAR-
TICULARLY FOR THREE AXLE VEHICLES
Giuseppe Alfieri, Milan, Italy, assignor to Fabbrica Itali-
ana Magneti Marelli S.p.A., Milan, Italy, a firm
Filed Oct. 8, 1959, Ser. No. 845,147
Claims priority, application Italy Nov. 24, 1958
3 Claims. (Cl. 280—104.5)

The present invention relates to a pressure fluid dis-
tributor for feeding pneumatic suspensions, particularly
suspensions of three axle vehicles. The invention re-
lates especially to such a distributor which feeds to con-
nected operating members only pressure which is higher
than a preestablished value.

Usually, operating members of a pneumatic plant are
fed with like pressures by a single feeding circuit con-
nected to a distribution device.

In certain pneumatic systems, however, the operating
members are required to function sequentially and with
a predetermined delay between action of one member
and another. Thus, supply of pressure to one operat-
ing member may occur only following the existance of
a predetermined pressure value in another operating
member.

These conditions occur in the pneumatic suspension
plants of vehicles, where said pneumatic suspensions are
formed, as it is well known, by bellows units interposed
between the wheel axle and the vehicle frame. The
vehicle may have a third axle having a similar pneu-
matic suspension.

In such vehicles two axles, that is the front axle
and the rear axle, always exercise a carrying function
both with the empty and the loaded vehicle.

The third axle, or auxiliary axle, on its part, pro-
vides additional carrying means for loads in excess of
those which may be properly carried by the front axle
and the rear axle together. When the vehicle carries a
load which the front and rear axles together may properly
carry, the third axle remains suspended from the frame
with its wheels lifted from the ground.

In vehicles provided with leaf springs, the third axle
operates in automatic manner. When the vehicle load
has been sufficiently increased, the leaf springs of the
front and rear axles are compressed with consequent
lowering of the vehicle frame until the third axle wheels
rest upon the ground and give additional support to the
vehicle.

In three axle vehicles with pneumatic suspension, it
is also desirable to maintain the third axle suspension
inactive until the vehicle load makes it necessary to
add the support of the third axle. As in the case of the
leaf spring suspension, it is necessary to add the suspen-
sion of the third axle only after the load upon the ve-
hicle has caused the pneumatic suspension of an already
supporting axle, as the rear axle, to rise to a predeter-
mined value. At this point, the same pressure is applied
to the pneumatic suspension of the third axle.

According to the invention, a special pressure fluid
distributor is provided by which this predetermined pres-
sure is automatically added to the suspension of the third
axle.

The pressure air distributor of the invention is ar-
ranged in the feeding pipe connecting the pneumatic
suspension or bellows of the rear axle with the bellows
of the third or auxiliary axle. The fluid passage be-
tween such members is cut off by a control valve of said
distributor responsive to the pressure in the rear axle
suspension. Opening of said valve occurs only when
the pressure in the suspension of the rear axle suspension
has reached a predetermined value, whereas the valve
remains closed when the pressure in the suspension of
the read axle is lower than said value.

The invention will be hereinafter exemplified with
reference to the accompanying drawings, wherein.

Figure 1:
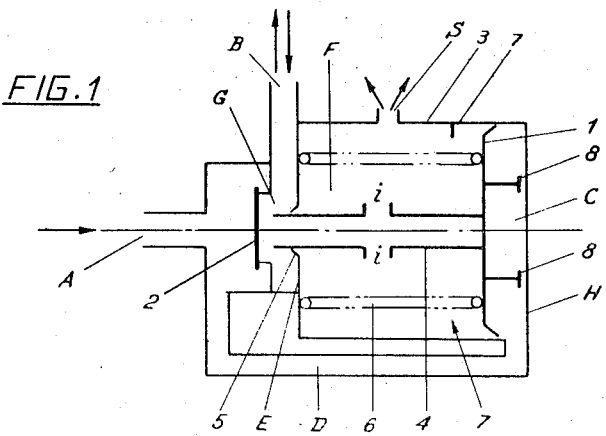
FIG. 1 is a diagrammatic illustration of a pressure air
distributor according to the invention.
Figure 3:
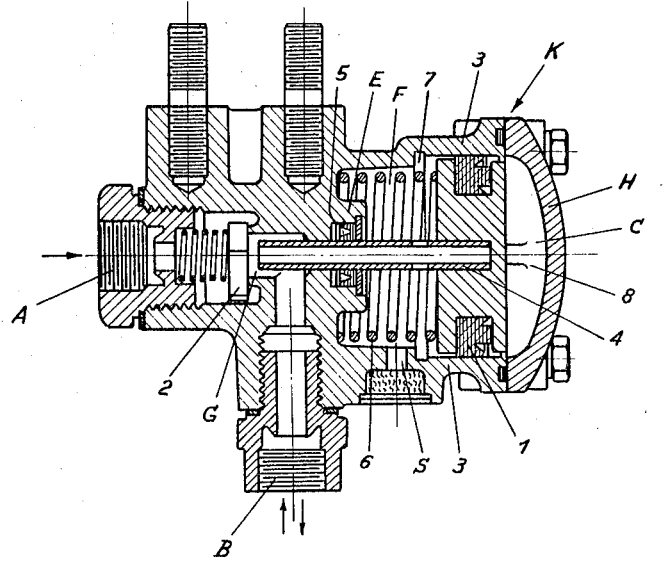
FIG. 3 is a longitudinal mid-section through a dis-
tributor such as that diagrammatically illustrated in
FIG. 1.
Figure 4:
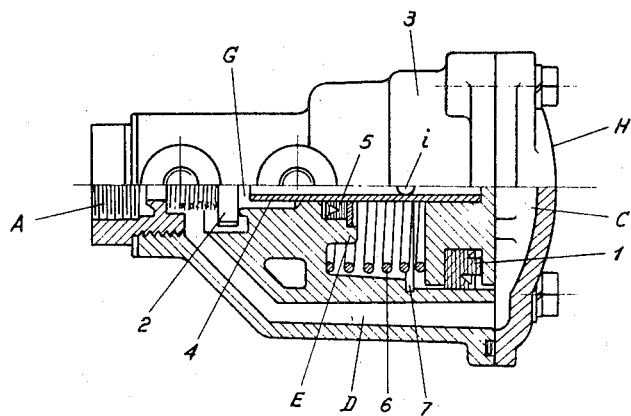
FIG. 4 is a half plan view of the distributor shown
in FIG. 3, the other half of this figure being a longitu-
dinal mid-section of the distributor taken at right angles
to that shown in FIG. 3.

Referring now to FIGS. 1, 3 and 4 of the drawings,
an internally threaded socket A provides a connection
with the distributor for a pipe (not shown) connected
to the pressure of the rear axle pneumatic suspension,
and a second internally threaded socket B provides a
connection with the distributor for a pipe (not shown)
connected to the pneumatic suspension of the third axle
of the vehicle. Thus, when the distributor opens a pas-
sage therethrough between the socket A and the socket
B, the pressure in the rear axle suspension and that in
the third axle suspension will be substantially equal. A
valve 2 at one end of the distributor, when closed, sepa-
rates the pressure carried into the distributor through
the socket A from reaching the second socket B, the
pressure carried to the socket A tending to keep the
valve 2 closed. A pressure chamber C in the opposite
end of the distributor is connected through a duct D
with the pressure tending to close the valve 2; and a
control plunger 1 slidable toward and away from the
valve 2 in a cylinder 3 of the distributor and provides
a movable wall of the pressure chamber C.

A hollow push rod 4 connected at one end to the
plunger 1 extends axially of the cylinder 3 from the
plunger toward the valve 2 for opening the latter when
sufficient pressure exists in the chamber C to move the
plunger with sufficient force toward the valve. Op-
posite the plunger 1, the cylinder 3 has an end wall E
displaced from the valve 2 and the socket B to provide
a chamber G downstream from the valve 2 and in com-
munication with the socket B. The end wall has cen-
trally thereof a guide 5 through which the push rod 4
slides in sealing contact therewith.

A reaction spring 6, selected to apply a predetermined
force, is compressed between the plunger 1 and the end
wall E in order, with pressure below a certain value in
the chamber C, to hold the plunger away from the end
wall and the adjacent end of the hollow push rod away
from the valve 2. Furthermore, flanges 8 are fixed to
the plunger 1 extending outwardly thereof away from the
push rod 4 to make contact with the wall of the cylin-
der opposite the end wall E and preserve a minimum
volumetric capacity of the chamber C no matter how
far the pressure is reduced.

With the hollow push rod 4 positioned away from
the valve 2, as shown in FIGS. 1 and 3, pressure may
be relieved from the third axle suspension to the cham-
ber G, thence through the hollow push rod 4, through
side openings $i$ therein into the cylinder 3. From the
cylinder 3 this pressure is relieved through a side bore
S in its cylindrical wall. See FIGS. 1 and 3.

The distributor operates as follows:

The pressure air in A has a pressure value depending
on the load as applied to the vehicle, being regulated by the levelling device indicated generally at 24 that feeds the suspension of the rear axle. The same pressure conditions occur in the chamber C connected to the pipe connection by means of the duct D.

The control plunger 1 is therefore under a load that tends to cause sliding thereof in the cylinder 3.

The reaction spring 6, however, opposes sliding motion of the plunger under action of pressure in the chamber C. The spring 6 is selected to have sufficient force to prevent the push rod 4 from reaching and opening valve 2 until the pressure acting on the plunger corresponds to a vehicle load which requires the third axle to be put under load.

After reaching said load value the pressure on the control plunger becomes so high as to overcome the resistance of the reaction spring 6 and the total pressure on the smaller surface of the valve 2, thus causing motion of push rod that lifts the valve 2 from its seat. Direct communication is thus effected between the sockets A and B, and therefore between the rear axle suspension and the third axle suspension. The latter is then fed only at the pressure value that has caused the valve 2 to open, and the pressure required to open the valve can be altered at will by selection of the spring 6.

When in direct communication with the rear axle the third axle suspension is therefore under pressure and can exercise a carrying function, as it maintains the associated wheels in contact with the ground.

A successive load increase on the vehicle causes a corresponding pressure increase in the suspensions of the first and second axle and therefore also in the suspension of the third axle that is connected to the suspension of the rear axle. When the vehicle load is reduced to a value that is lower than that causing action of the third axle, a new balance condition of the cutting off device takes place. The pressure in the chamber C acting on the plunger 1 then becomes lower than the force of the spring, and the distributor returns to inactive position. See FIGS. 1 and 3.

When the distributor is in inactive position, the forward end of the push rod 4 is withdrawn from contact with the valve 2, and pressure from the third axle suspension is exhausted as described above. In the absence of pressure within the third axle suspension the wheels of the third axle carry no load.

It is to be understood that at lower loads only the front and rear axles of the vehicle support the load. Pressure in the axle suspensions varies with the vehicle load.

Figure 2:
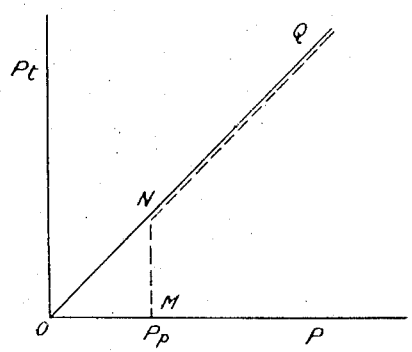
FIG. 2 is a pressure curve illustrating the variation of
the pressure in the third axle suspensions with the feed-
ing pressure.
Figure 5:
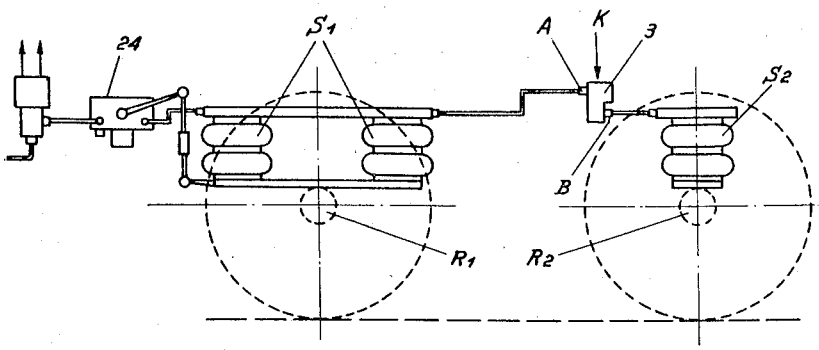
FIG. 5 is a schematic diagram illustrating the oper-
ative connection between the distributor of FIG. 1 and
the axles of the vehicle suspension system.

Operation of the distributor is further illustrated in the diagram of FIG. 2, wherein the abscissa is the pressure $p$ in the rear axle suspension and the ordinate is the pressure $pt$ in the third axle suspension.

A broken line OM—MN—NQ indicates the pressure in the latter suspension. The first part OM of said line corresponds to pressure values at the socket A, that is in the second axle suspension, which vary between zero and a limit value for which the third axle does not yet work. The second or vertical part MN shows the pressure difference in the suspension of the auxiliary axle when the latter begins to work at the pressure value designated "$p_p$" in FIG. 2 and corresponding to the minimum vehicle load to be distributed between the three axles.

Finally the next part NQ shows the common pressure run of all suspensions for pressures above the value "$p_p$."

When the load on the vehicle decreases, the pressure follows the line NQ of the broken line in reverse direction till the pressure is reduced to "$p_p$." The broken line part NM represents in this case unloading of the third axle suspension, and NO further pressure reduction in the third axle suspension.

I claim:

1. In a multi-axle vehicle having a pneumatic suspension system, a pressure fluid distributor for feeding pressure fluid from the pneumatic suspension of the rear axle to the pneumatic suspension of another axle in response to the increase of load on the suspension of the rear axle, said distributor having a connection with the rear axle suspension and a second connection with said another axle suspension, a valve seat positioned within said distributor between said connections, a valve on the upstream side of said valve seat for controlling the flow of pressure fluid from the rear axle suspension to said another axle suspension, a plunger of greater diameter than said valve reciprocable toward and away from said valve, a hollow push rod connected at one end thereto and extending axially therefrom toward the downstream face of said valve, a spring biasing said plunger and push rod away from said valve, said distributor having a pressure chamber therein on the side of said plunger opposite to said valve, and a duct extending from the first-named connection to the pressure chamber, whereby when the load on the rear axle exceeds a predetermined value the plunger moves against the spring, the push rod opens the valve, and communiaction is established between the pneumatic suspensions of the rear and said another axles.

2. In a multi-axle vehicle having a pneumatic suspension system, a pressure fluid distributor for feeding pressure fluid from the pneumatic suspension of the rear axle to the pneumatic suspension of another axle in response to the increase of load on the suspension of the rear axle, said distributor having a connection with the rear axle suspension and a second connection with said another axle suspension, a valve seat positioned within said distributor between said connections, a valve on the upstream side of said valve seat for controlling the flow of pressure fluid from the rear axle suspension to said another axle suspension, a cylinder positioned within the distributor, a plunger of greater diameter than said valve reciprocable within said cylinder toward and away from said valve, a hollow push rod connected at one end to said plunger and extending axially therefrom toward the downstream face of said valve, the cylinder being provided with a front wall having a central guide formed therein in which the push rod slides in sealing engagement therewith, a spring positioned within the cylinder between the front wall and the plunger biasing said plunger and push rod away from said valve, the distributor having a pressure chamber therein on the side of said plunger opposite to said valve, and a duct extending from the first-named connection to the pressure chamber, whereby when the load on the rear axle exceeds a predetermined value the plunger moves against the spring, the push rod opens the valve, and communication is established between the pneumatic suspensions of the rear and said another axles.

3. In a multi-axle vehicle having a pneumatic suspension system, a pressure fluid distributor for feeding pressure fluid from the pneumatic suspension of the rear axle to the pneumatic suspension of another axle in response to the increase of load on the suspension of the rear axle, said distributor having a connection with the rear axle suspension and a second connection with said another axle suspension, a valve seat positioned within said distributor between said connections, a valve on the upstream side of said valve seat for controlling the flow of pressure fluid from the rear axle suspension to said another axle suspension, a cylinder positioned within the distributor, a plunger of greater diameter than said valve reciprocable within said cylinder toward and away from asid valve, a hollow push rod connected at one end to said plunger and extending axially therefrom toward the downstream face of said valve, the cylinder being provided with a front wall having a central guide formed therein in which the push rod slides in sealing engagement therewith, the front wall of the cylinder being displaced from the valve and the second connection thereby providing a chamber between said front wall and said valve on the downstream side of said valve in which the open end of the hollow push rod reciprocates, a spring positioned within the cylinder between the front wall and the plunger biasing said plunger and push rod away from said valve, the distributor having a pressure chamber therein on the side of said plunger opposite to said valve, a duct extending from the first-named connection to the pressure chamber, whereby when the load on the rear axle exceeds a predetermined value the plunger moves against the spring, the push rod opens the valve thereby establishing communication between the pneumatic suspensions of the rear and said another axles, the push rod having side apertures therein communicating with the interior of the cylinder, and an exhaust port formed in the wall of said cylinder in communication with atmosphere, whereby upon the decrease of fluid pressure on the plunger the push rod is withdrawn from the valve, the fluid pressure in the third axle suspension exhausts to atmosphere through the chamber, the hollow push rod, the side apertures in said push rod and the exhaust port in the cyliinder.

References Cited in the file of this patent

UNITED STATES PATENTS

| | | |
|---|---|---|
| 2,248,322 | Annin | July 8, 1941 |
| 2,534,509 | Franck | Dec. 19, 1950 |
| 2,659,446 | Willock | Nov. 17, 1953 |
| 2,724,449 | MacPhee | Nov. 22, 1955 |
| 2,777,529 | Harbers | Jan. 15, 1957 |
| 2,864,454 | La Belle | Dec. 16, 1958 |